United States Patent
Koh et al.

(10) Patent No.: US 8,982,416 B2
(45) Date of Patent: Mar. 17, 2015

(54) PROVIDING A MAPPING DATA STRUCTURE FOR USE IN GENERATING A PROOF

(75) Inventors: Kok-Wei Koh, Mountain View, CA (US); Ingeborg Tastl, San Mateo, CA (US); Fabio Giannetti, Los Gatos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/983,173

(22) PCT Filed: Feb. 2, 2011

(86) PCT No.: PCT/US2011/023454
§ 371 (c)(1),
(2), (4) Date: Aug. 1, 2013

(87) PCT Pub. No.: WO2012/105970
PCT Pub. Date: Aug. 9, 2012

(65) Prior Publication Data
US 2013/0335761 A1  Dec. 19, 2013

(51) Int. Cl.
*H04N 1/40* (2006.01)
*G06K 15/02* (2006.01)
*H04N 1/54* (2006.01)
*H04N 1/60* (2006.01)

(52) U.S. Cl.
CPC .......... *G06K 15/025* (2013.01); *H04N 1/54* (2013.01); *H04N 1/6055* (2013.01)
USPC .......................................... 358/2.1; 358/527

(58) Field of Classification Search
CPC ......... H04N 1/6033; H04N 1/54; H04N 1/52; H04N 1/6052; H04N 1/6022; H04N 1/62; H04N 1/6011; H04N 1/60; H04N 1/4078; H04N 1/6013; H04N 1/6072; H04N 1/6055; G01J 3/46; G01J 3/52; G01J 3/50; G01J 3/524
USPC ............ 358/1.9, 2.1, 504, 406, 527, 400, 500
See application file for complete search history.

(56) References Cited

U.S. PATENT DOCUMENTS

| | | | |
|---|---|---|---|
| 6,473,197 B1 | 10/2002 | Shimazaki | |
| 7,580,150 B2 | 8/2009 | Mahy | |
| 7,595,910 B2 | 9/2009 | Mahy | |
| 2005/0036162 A1 | 2/2005 | Edge | |
| 2005/0219593 A1 | 10/2005 | Hoshino | |
| 2006/0170939 A1 | 8/2006 | Misumi | |
| 2007/0080974 A1 | 4/2007 | Edge | |
| 2007/0211269 A1* | 9/2007 | Patrick et al. | 358/1.9 |
| 2008/0043263 A1 | 2/2008 | Hancock | |
| 2011/0013206 A1 | 1/2011 | Mestha | |
| 2011/0043849 A1 | 2/2011 | Koh | |

FOREIGN PATENT DOCUMENTS

EP   0758181   2/1997

OTHER PUBLICATIONS

Korean Intellectual Property Office, Int. Appl. No. PCT/US2011/023454 Search Report and Written Opinion dated Sep. 22, 2011 (7 pages).

* cited by examiner

*Primary Examiner* — Thomas D Lee
*Assistant Examiner* — Stephen M Brinich

(57) ABSTRACT

To generate a proof of a printable item, a data structure is provided that maps a set of spot colors into a respective set of color values based on measurement data provided by a measurement device of colors printed by a printing system from the spot colors.

15 Claims, 3 Drawing Sheets

PROVIDING A MAPPING DATA STRUCTURE FOR USE IN GENERATING A PROOF

CROSS-REFERENCE TO RELATED APPLICATION

This application is a national stage application under 35 U.S.C. §371 of PCT/US 2011/023454, filed Feb. 2, 2011.

BACKGROUND

Proofing refers to a process of generating, by a proofing device, a user-viewable preview of an item that is to be printed by a printing system. The proofing device is typically different from the printing system. Often, it is difficult to produce accurate proofs of items that are to be printed by the printing system.

BRIEF DESCRIPTION OF THE DRAWINGS

Some embodiments are described with respect to the following figures.

DETAILED DESCRIPTION

Figure 1:
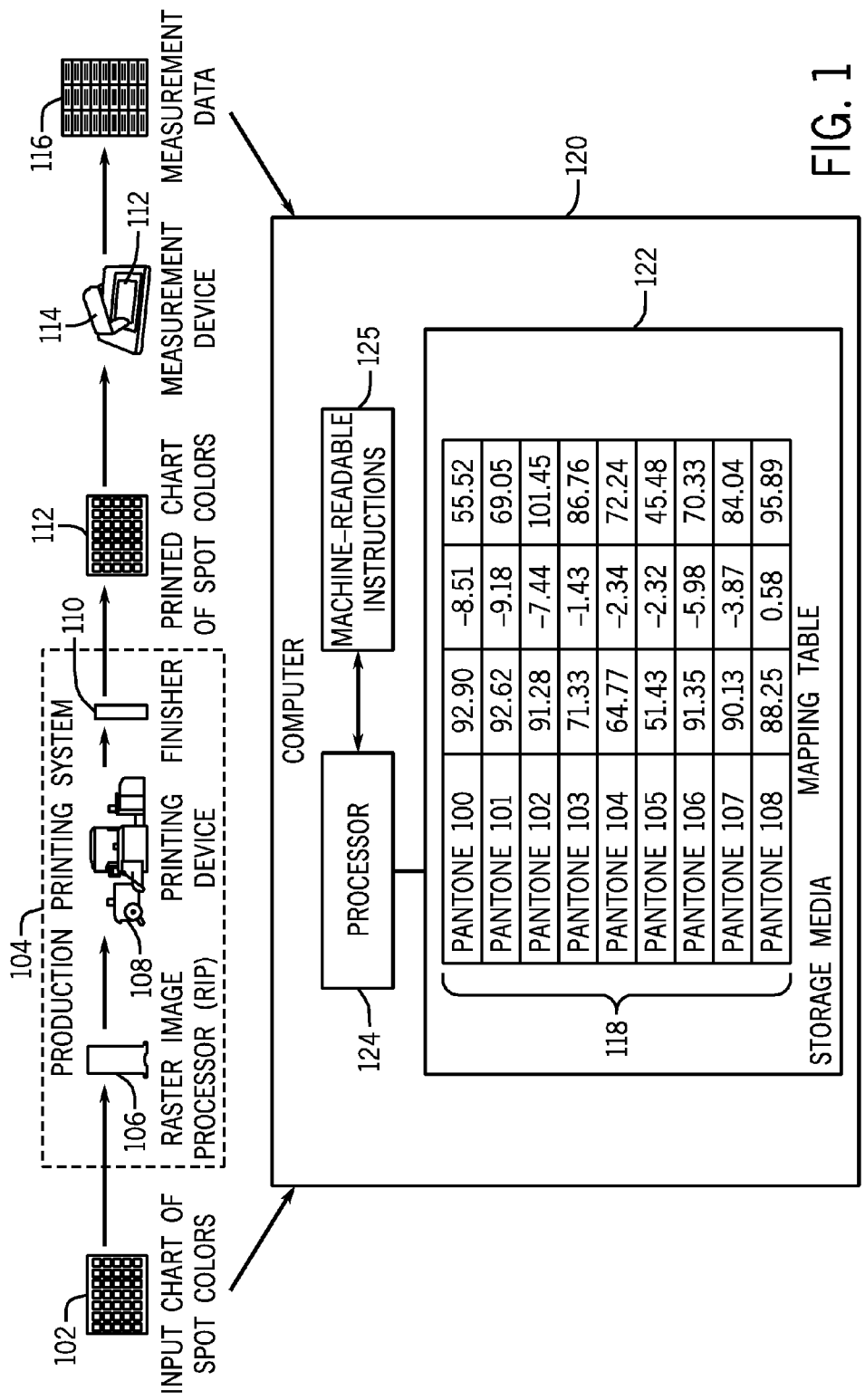
FIG. 1 is a block diagram of a system for generating a mapping data structure to use in generating a proof of a printable item by a proofing device, in accordance with some implementations.

Generating an accurate proof of an item to be printed by a printing system can be challenging. A "proof" refers to a user-viewable representation of the item that is to be printed ("printable item"), where the representation is used to enable a user to see and evaluate what the item will look like prior to printing by the printing system. A proof of a printable item is typically generated by a proofing device, which can be integrated with or separate from the printing system. Examples of a printable item include a document, a brochure, a user manual or guide, marketing materials, and so forth.

A printable item can have various colors, which may not be accurately reproduced by a proofing device—in other words, the colors in the proof of the printable item may not match the colors in a printed item as printed by the printing system.

In some cases, once the user gives approval based on the proof, a relatively large number of copies of the printable item can be printed by the printing system. If the proof of the printable item generated by the proofing device is not an accurate reproduction of the items as printed by the printing system (the colors of the proof are inaccurate), then the user may find the printed items unacceptable, which may result in the printed items being discarded and the process of designing the printable item, proofing the printable item, and printing the printable item being repeated.

The proofing device can be a printer for printing the printable item, or alternatively, the proofing device can be a monitor for displaying the proof. In either case, it is desired that colors in the proof of the printable item match colors of the printed item (as printed by the printing system). Matching colors of the proof to respective colors of the printed item refers to causing the colors of the proof to appear (to a user) to be identical or nearly identical to respective colors of the printed item. A color of the proof is "nearly identical" to a respective color of the printed item if the two colors appear to be the same color to within some predefined tolerance.

In general, the content of a printable item such as a document is color managed either by an application, or a raster image processor (RIP) into a device-dependent color specification adequate for the printing system. As noted above, a proofing device can either be an integral part of the printing system, in which case the output of the RIP is further converted into a device-specific form adequate for the proofing device. Alternatively, the proofing device can be separate from the printing system. In the latter case, the proofing device has to simulate the color transformations for the printing system and then in addition perform the color transformations for the proofing device.

Implementations discussed herein focus specifically on the proofing of spot colors. A designer can specify content in a printable item through a spot color (e.g. Pantone named color). In the preparation for printing by the printing system, if a spot color is supposed to be reproduced by using a combination of C (cyan), M (magenta), Y (yellow) and K (black) inks or CMYKOV (cyan, magenta, yellow, black, orange, violet) inks, for example, the spot color is transformed into a device-independent form and in the end into amounts of CMYK or CMYKOV inks. For proofing purposes, those CMYK/CMYKOV values have to be converted into proofer-dependent values using the inverse transformation of the ICC (International Color Consortium) press profile that was used in the first place. An ICC profile includes information that characterizes the color reproduction of the printing system. The issue with the foregoing approach is that CMYK profiles in general and n-color profiles (such as CMYKOV) in particular are not 100% invertible, which can lead to errors. This happens even in the best case scenario where the proofing device is an integral part of the printing system. In the case of a stand-alone proofing device, the error increases as the proofing device has to simulate the color management being performed by the printing system.

Techniques according to some implementations relate to creating a proof of a printable item, where the spot colors of the proof are previewed as accurately as possible for both an integrated and a stand-alone proofing device. According to some implementations, instead of modeling the color transformations applied to the spot colors by the printing system, the printing system is simply treated as a black box and the resulting color values printed on the paper (or other substrate) are measured and then used for proofing purposes.

In accordance with some implementations, to allow for generation of an accurate proof of a printable item, a mapping data structure is produced that maps input colors that are expected to be present in printable items to be printed by a printing system into color values based on measurement data. Techniques according to some embodiments concern input colors specified in the form of spot colors in a document creation application. Spot colors typically have unique identifiers (e.g. names) as well as a device independent color characterization and are used across organizational boundaries (e.g., different companies or other types of organizations). For example, spot colors can be used in the graphic arts area, and the spot colors are understood and used by various players in this area, including designers, document creation software, print service providers, and so forth. Examples of spot colors are Pantone colors as defined by the Pantone color matching system. The Pantone color matching system is a standardized color reproduction system that defines standard colors, such that different entities (e.g., different manufacturers or other producers of items containing colors) can reproduce the same colors.

The color values based on measurement data that are mapped by the mapping data structure are values originating from a measurement device, as further discussed in connection with FIG. 1.

As shown in FIG. 1, an input chart 102 of spot colors (e.g., Pantone colors) is input to a printing system 104. The spot colors in the input chart 102 include those spot colors that are expected to be present in printable items to be printed by the printing system 104. In FIG. 1, the printing system 104 is referred to as a "production" printing system because it is used to produce a relatively large number of printed items. The input chart 102 of spot colors can be in the form of an electronic file, which is processed by the printing system 104 to print a representation (printed chart 112) of the input chart 102 of spot colors.

The printing system 104 includes a raster image processor (RIP) 106, which produces a raster image (also referred to as a bitmap) based on the input (e.g., input chart 102) to the printing system 104. The RIP 106 in the printing system 104 produces a raster image that emulates the spot colors in the input chart 102. The printing system 104 is associated with a particular set of inks and a corresponding device dependent color space, such as the CMYK (cyan, magenta, yellow, and black) color space, CMYKOV (cyan, magenta, yellow, black, orange, violet) color space, CMYKOVG (cyan, magenta, yellow, black, orange, violet, green) color space, or any other color space having n colors, where n is an integer number greater than or equal to 3.

The RIP 106 or any additional pre-RIP module can store a mapping data structure, such as a mapping table, that maps spot colors to respective colors in the color space of the printing system 104. Thus, upon receiving the input chart 102 of spot colors, the spot colors of the input chart 102 are converted to the respective colors of the printing system color space using the mapping table in the RIP 106.

Alternatively, instead of using a mapping table, the RIP 106 can use an ICC (International Color Consortium) profile, which includes information that characterizes the color reproduction of the printing system 104. An ICC profile defines a mapping between the color space of the printing system 104 and a device-independent color space, such as the 1976 CIELAB (L*a*b*) color space. In L*a*b*, L* represents lightness, while a* and b* represents color-component dimensions.

The raster image (or bitmap) is provided to a printing device 108 to produce a printed item. In examples according to FIG. 1, the input chart 102 of spot colors is printed onto a substrate (e.g., paper, cardboard, or other substrate).

As depicted in FIG. 1, the output of the printing device 108 is provided to a finisher 110, which can apply post-processing to the substrate containing the chart of spot colors as produced by the printing device 108. Examples of post-processing that are applicable by the finisher 110 include application of varnish, application of lamination, and so forth. In some examples, the finisher 110 can be omitted.

The output of the printing system 104 (either output from the printing device 108 or the finisher 110), based on the input chart 102 of spot colors, is the printed chart 112 of spot colors, as printed onto a substrate. The printed chart 112 of spot colors reproduces the spot colors that are present in the input chart 102 of spot colors.

As further shown in FIG. 1, a measurement device 114 is provided to measure the colors of the printed chart 112. The measurement device 114 can be a spectrophotometer, in some examples. The measurement device 114 is able to produce L*a*b* values or spectral values based on measuring the colors of the printed chart 112. More generally, the measurement values output by the measurement device 114 can be any device-independent representations of colors. A device-independent representation of a color refers to a representation that is independent of any particular input or output device.

The output of the measurement device 114 is a collection 116 of measurement data. In the example given in FIG. 1, the collection 116 of measurement data includes L*a*b* measurement data, which includes a first column of L* values, a second column of a* values, and a third column of b* values. Each row of L*a*b* values corresponds to a respective one of the spot colors in the printed chart 112.

Color values based on the measurement data (116) can be mapped to the respective spot colors (of the input chart 102) in a mapping data structure 118, which can be in the form of a mapping table in examples according to FIG. 1. In the mapping table 118, the first column includes the spot colors (indications, such as names, of spot colors), which are Pantone colors in some examples. The last three columns of the mapping table 118 correspond to the L*, a*, and b* values measured by the measurement device 114. More generally, the mapping table 118 can map spot colors to respective values that are based on the measurement data (116) output by the measurement device 114. The values in the mapping table 118 are "based on" the measurement data if values equal the measurement data output by the measurement device 114, or alternatively, the values are calculated from the measurement data output by the measurement device 114. Values calculated from the measurement data can include proofing device specific color values.

In some implementations, such as depicted in FIG. 1, the measurement data (116) and the input chart 102 of spot colors are provided as inputs to a computer 120. The computer 120 combines the inputs to produce the mapping table 118. An electronic file containing the input chart 102 of spot colors contains information regarding the locations of the different spot colors. Thus, the computer 120 can use the location information to correlate the spot colors of the input chart 102 to the measurement data (116) output by the measurement device 114.

The mapping table 118 can be stored by the computer 120 in a storage media 122 of the computer 120. Examples of the storage media 122 can include a disk-based storage device and/or an integrated circuit or semiconductor storage device. The storage media 122 is connected to a processor 124 of the computer 120, and the processor 124 performs the tasks involved in producing the mapping table 118 based on the input chart 102 and the measurement data 116. The processor 124 can perform such tasks under control of machine-readable instructions 125 executed on the processor 124, for example. Alternatively, the tasks can be performed in hardware without machine-readable instructions.

Alternatively, instead of storing the mapping table 118 in the storage media 122, the mapping table 118 can be sent by the computer 120 to another device to use, such as a proofing device or another computer connected to the proofing device.

Note that in some implementations, multiple mapping tables 118 can be generated based on the input chart 102 of spot colors. For example, there can be one mapping table 118 per configuration of the printing system 104. A configuration of the printing system 104 can be based on any one or combination of the following factors: inks used by the printing device 108, type of substrate onto which the printable item is to be printed, type of finishing applied to the printed output, and color management strategy. Different color management strategies can correspond to different rendering intents, for example.

The inks used by the printing device 108 can be process inks (CMYK, CMYKOV) or customized inks, where a customized ink can be a special ink ordered to reproduce a particular spot color (e.g. Pantone 287 C). Using techniques according to some implementations, a proof can be generated that accurately reproduces the particular spot color as printed using the special ink by the printing system 104.

In some examples, if there is a fixed printing system/proofing device combination, the mapping table 118 can be populated with spot colors that are mapped to proofing device dependent color values (color values in the color space associated with the proofing device). In such examples, instead of mapping spot colors to device-independent color values (such as $L^*a^*b^*$ values), the mapping table 118 maps spot colors to a device-dependent color specification.

Figure 2:
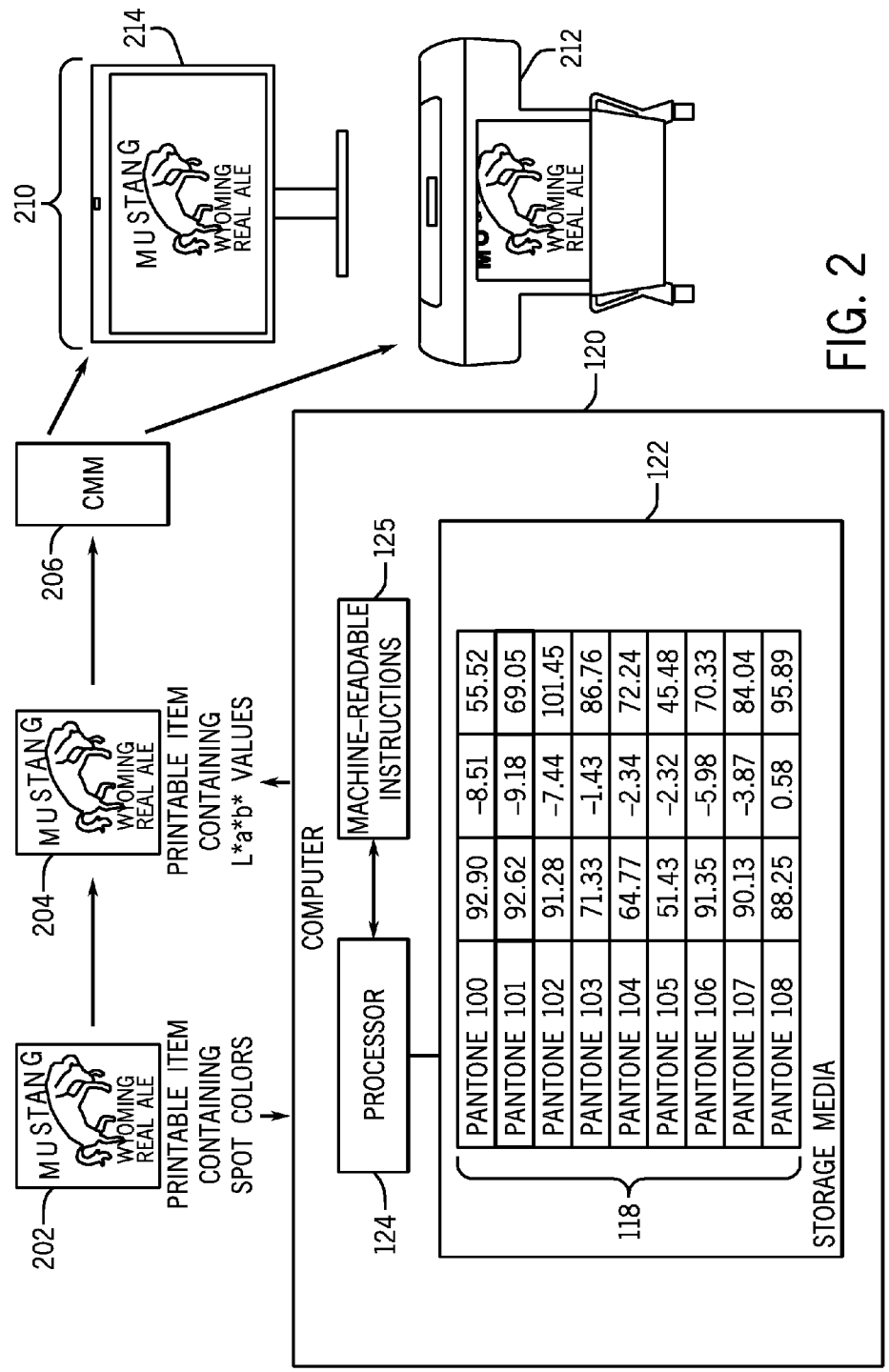
FIG. 2 is a block diagram of a system for producing a proof of a printable item using the mapping data structure of FIG. 1, according to some implementations.

FIG. 2 illustrates an example arrangement for using the mapping table 118 produced in FIG. 1. The arrangement depicted in FIG. 2 includes the same computer 120 as shown in FIG. 1—alternatively, a computer different from the computer 120 shown in FIG. 1 can be used in the arrangement of FIG. 2. Although depicted as being separate from a proofing device 210, the computer 120 of FIG. 2 can be part of the proofing device 210.

The mapping table 118 provides a table lookup structure that allows for relatively quick lookup of device-independent color values, such as $L^*a^*b^*$ values, spectral values, and so forth. Alternatively, the mapping table 118 maps spot colors to proofing device dependent color values.

In the ensuing discussion, it is assumed that the mapping table 118 maps spot colors to $L^*a^*b^*$ values, although the techniques according to some implementations can also be applied to other types of mapping tables.

After the mapping table 118 has been generated and stored in the storage media 122, the computer 120 can be provided with a printable item 202 that contains at least one element with spot colors. The element can be text and/or graphics. The processor 124 in the computer 120 accesses the mapping table 118 to produce a document 204 that contains respective $L^*a^*b^*$ values corresponding to the spot colors in the input printable item 202. The $L^*a^*b^*$ values for the image 204 are retrieved from the mapping table 118 using the spot colors in the input printable item 202.

The printable item with $L^*a^*b^*$ values 204 is provided to a color management module (CMM) 206, which can also be referred to as a color engine. The CMM 206 includes information to map $L^*a^*b^*$ values (such as $L^*a^*b^*$ values in the image 204) to proofing device dependent color values. For example, the CMM 206 can use an ICC profile to perform the mapping between the $L^*a^*b^*$ values in the image 204 to proofing device dependent color values.

In some examples, the CMM 206 can be part of the proofing device 210. Alternatively, the CMM 206 can be a module that is part of an image processing application, which can be run in the computer 120.

The proofing device 210 can either include a printer 212 or a display device 214. The printable item 204, after being processed by the CMM 206, is output as the proof of the printable item 202, either for display by the display device 214, and/or for printing by the printer 212. In either case, the generated proof contains colors that match the colors that are expected to be printed by the printing system 104 (FIG. 1) based on the printable item 202.

In implementations where the mapping table 118 maps spot colors to proofing device dependent color values, the processing of the image 204 by the CMM 206 to convert from $L^*a^*b^*$ values to the proofing device colors can be omitted.

Figure 3:
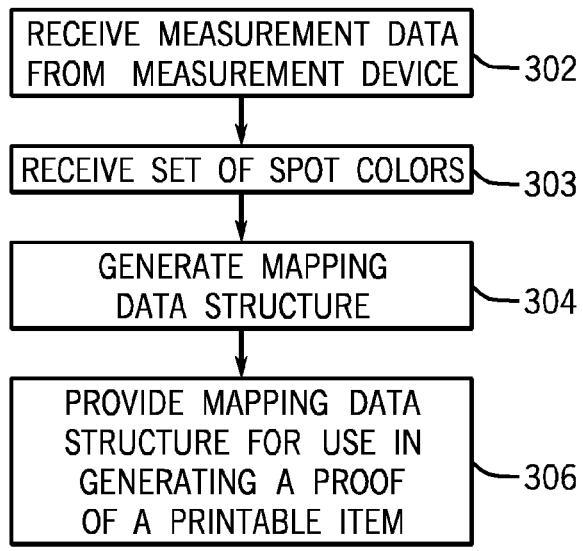
FIG. 3 is a flow diagram of a process of generating a mapping data structure according to some implementations.

FIG. 3 is a flow diagram of a process performed by the computer 120 to generate a mapping data structure, in accordance with some implementations. The process can be performed by the machine-readable instructions 125, for example. The computer 120 receives (at 302) measurement data of colors on a printed chart 112 of spot colors (as printed by the printing system 104 of FIG. 1), where the measurement data is measured by the measurement device 114. The computer 120 also receives (at 303) a set of spot colors, such as a list or chart (102 in FIG. 1) of spot colors.

Based on the measurement data, and further based on the set of spot colors, the computer 120 generates (at 304) a mapping data structure (such as the mapping table 118 of FIG. 1) to map spot colors to color values based on the measurement data. The mapping data structure is provided (at 306) (stored in the computer 120 or communicated to a remote location) by the computer 120 for use in generating a proof of a printable item by a proofing device, such as the proofing device 210 in FIG. 2.

Figure 4:
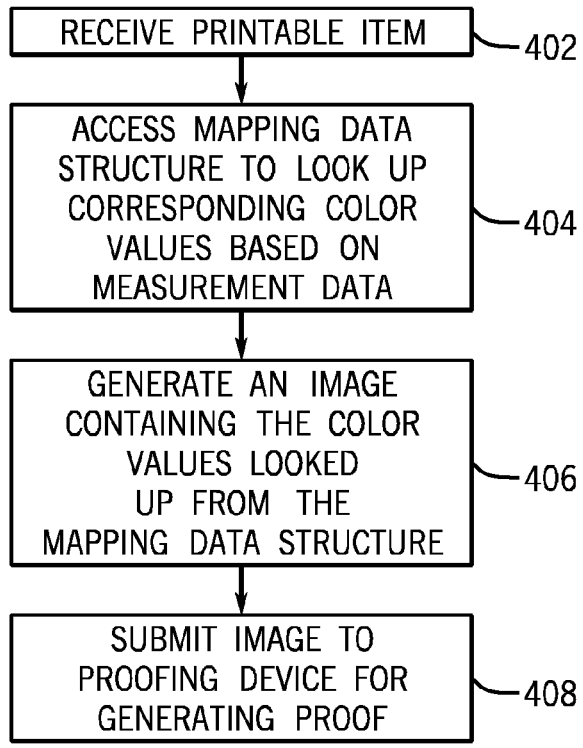
FIG. 4 is a flow diagram of a process of using the mapping data structure according to further implementations.

FIG. 4 is a flow diagram of a process performed by the computer 120 of using the mapping data structure, in accordance with further implementations. In alternative implementations, instead of being the same computer, the computer performing the tasks of FIG. 4 can be different from the computer performing the tasks of FIG. 3.

The computer 120 receives (at 402) a printable item that contains spot colors. Using the spot colors in the printable item, the computer 120 accesses (at 404) the mapping data structure (generated according to FIG. 3) to look up corresponding color values based on measurement data, where the color values can be $L^*a^*b^*$ values or proofing device dependent color values, for example. The computer 120 generates (at 406) an image containing the color values looked up from the mapping data structure. The image is submitted (at 408) to a proofing device for generating a proof of the printable item received at 402.

In examples discussed above, it is assumed that the printed chart 112 of spot colors are at 100% tint. In alternative implementations, the printed chart 112 of spot colors can include spot colors at various tints, such as at 25% tint, 50% tint, 75% tint, 100% tint, or at other discrete tint intervals. In such implementations, the printed chart 112 of spot colors would include a larger set of spot colors. In examples that use the 25%, 50%, 75%, and 100% tint intervals, there would be four patches on the printed chart 112 per given spot color, with a first patch containing the given spot color at 25% tint, a second patch containing the given spot color at 50% tint, a third patch containing the given spot color at 75% tint, and a fourth patch containing the given spot color at 100% tint.

The patches of different tints on the printed chart 112 can be measured by the measurement device 114 of FIG. 1, with respective measurement data output for the spot colors at various different tints. The measurement data from the measurement device 114 can then be used to populate the mapping table 118, which in these implementations would map spot colors (at the various discrete tints) to respective color values based on the measurement data from the measurement device 114.

Thus, a designer of a printable item (such as 202 in FIG. 2) can specify a particular tint for a given spot color in the printable item. In the case that the particular tint is at the respective tint intervals (25%, 50%, 75%, 100%, for example) in the mapping table 118, then a direct lookup of the mapping table 118 can be performed to retrieve the corresponding color value from the mapping table 118. However, if the particular tint is not at any of the tint intervals in the mapping table 118, then interpolation can be performed to derive a respective color value. For example, if the particular tint for a given spot color is at 40%, then the computer 120 can retrieve all the color values mapped to the given spot color (at several discrete tints), and linear interpolation can be applied to produce the color value at 40% (based on the color values at the other tint values). For example, if the color values in the mapping table 118 mapped to the spot colors are L*a*b* values, then the linear interpolation can be performed in the L*a*b* space (for example, the four L*a*b* values mapped to the 25%, 50%, 75%, and 100% tints of the given color can be linearly interpolated to 40%). Alternatively, the linear interpolation can be performed in the color space of the proofing device.

In some implementations, tests can be performed to determine whether interpolation in the L*a*b* space (or other device-independent color space) or interpolation in the proofing device color space will produce better results. Such tests can involve first printing spot colors at finer tint intervals (e.g., 10%, 20%, 30%, etc.), and then creating proofs of such spot colors at the finer tint intervals (with interpolations in the device-independent color space and proofing device color space) to determine which interpolation produces a closer match to the printed spot colors at finer tint intervals.

Being able to accurately generate proofs allows a user to ensure that a proof depicts colors that accurately represent the colors that would be printed by a printing system. In addition, techniques according to some implementations can allow a user to make an informed decision regarding which combination of printing devices, inks, substrates, and color management strategies to use to achieve a desired result. Also, settings in the printing system 104 (such as settings of the RIP 106) can be adjusted based on proofs produced by techniques according to some implementations.

Machine-readable instructions, such as 125 depicted in FIGS. 1 and 2 are loaded for execution on a processor (such as 124). A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs), digital video discs (DVDs), Blu-ray Disc (BD); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
receiving, by a system having a processor, measurement data measured by a measurement device of colors printed by a printing system;
generating, by the system, a data structure mapping a set of spot colors to a corresponding set of color values based on the measurement data, wherein the colors printed by the printing system are based on the spot colors provided to the printing system;
providing, by the system, the data structure for use in generating a proof of a printable item by a proofing device, wherein the printable item includes plural spot colors of the set of spot colors; and
converting, by accessing the data structure, the plural spot colors in the printable item to respective proofing device dependent color values, the converting comprising accessing the data structure to retrieve respective device-independent color values corresponding to the plural spot colors, and converting the device-independent color values to the respective proofing device dependent color values.

2. The method of claim 1, further comprising:
generating the proof that contains the respective proofing device dependent color values.

3. The method of claim 2, further comprising:
outputting the proof by displaying the proof on a display device of the proofing device, or printing the proof using the proofing device.

4. A method comprising:
receiving, by a system having a processor, measurement data measured by a measurement device of colors printed by a printing system, wherein the colors printed by the printing system comprise, for each of the colors, plural tints of the corresponding color, wherein receiving the measurement data comprises receiving measurement data of the plural tints of respective ones of the colors printed by the printing system;
generating, by the system, a data structure mapping a set of spot colors to a corresponding set of color values based on the measurement data wherein the colors printed by the printing system are based on the spot colors provided to the printing system, and wherein the data structure maps the measurement data of the plural tints to corresponding tints of the spot colors: and
providing, by the system, the data structure for use in generating a proof of a printable item by a proofing device.

5. The method of claim 4, wherein the printable item includes plural spot colors of the set of spot colors, and wherein the color values based on the measurement data in the data structure comprise proofing device dependent color values, the method further comprising:
converting, by accessing the data structure, the plural spot colors in the printable item to respective proofing device dependent color values, wherein converting the plural spot colors in the printable item to the respective proofing device dependent color values comprises retrieving the respective colors of a color space of the proofing device from the data structure.

6. The method of claim 4, wherein the printable item includes plural spot colors of the set of spot colors, the method further comprising:
- converting, by accessing the data structure, the plural spot colors in the printable item to respective proofing device dependent color values, and wherein converting the plural spot colors in the printable item to the respective proofing device dependent color values comprises:
- accessing the data structure to retrieve respective device-independent color values corresponding to the plural spot colors; and
- converting the device-independent color values to the respective proofing device dependent color values.

7. The method of claim 4, further comprising:
- using interpolation to generate, for the proof, a particular tint of a particular one of spot colors in the printable item, wherein the interpolation is performed in a first color space represented by the color values based on the measurement data in the data structure, or performed in a second color space of the proofing device.

8. The method of claim 7, further comprising:
- performing tests to determine whether the interpolation in the first color space or the interpolation in the second color space produces interpolated results that produce better results.

9. An article comprising at least one non-transitory machine-readable storage medium storing instructions that upon execution cause a system having a processor to:
- receive measurement data measured by a measurement device of colors printed by a printing system;
- generate a data structure mapping a set of spot colors to a corresponding set of color values based on the measurement data, wherein the colors printed by the printing system are based on the spot colors provided to the printing system;
- provide the data structure for use in generating a proof of a printable item by a proofing device, wherein the printable item includes plural spot colors of the set of spot colors; and
- convert, by accessing the data structure, the plural spot colors in the printable item to respective proofing device dependent color values, wherein the color values based on the measurement data in the data structure comprise proofing device dependent color values, and wherein the converting comprises retrieving the respective colors of a color space of the proofing device from the data structure.

10. A system comprising:
- a proofing device to output a proof of a printable item having plural spot colors; and
- at least one processor to:
  - access a data structure mapping a set of spot colors to a respective set of color values based on measurement data measured by a measurement device of colors printed by a printing system from the set of spot colors; and
  - convert, based on accessing the data structure, the plural spot colors of the printable item to respective proofing device dependent color values, wherein the converting comprises accessing the data structure to retrieve respective device-independent color values corresponding to the plural spot colors, and converting the device-independent color values to the respective proofing device dependent color values,
- wherein the proofing device is to generate the proof based on the proofing device dependent color values.

11. The system of claim 10, wherein the plural colors of the printable item include a subset of the set of spot colors.

12. The system of claim 10, further comprising:
- the measurement device to measure the printed colors printed onto a substrate by the printing system to generate the measurement data.

13. The system of claim 10, further comprising:
- the printing system to print the printed colors using process inks selected from among CMYK or CMYKOV.

14. The system of claim 10, further comprising:
- the printing system to print a particular one of the printed colors using a customized ink.

15. The system of claim 10, further comprising:
- the printing system, wherein the printing system includes a finisher to apply lamination or varnish.

* * * * *

UNITED STATES PATENT AND TRADEMARK OFFICE
CERTIFICATE OF CORRECTION

PATENT NO.         : 8,982,416 B2  
APPLICATION NO.    : 13/983173  
DATED              : March 17, 2015  
INVENTOR(S)        : Kok-Wei Koh et al.

Page 1 of 1

It is certified that error appears in the above-identified patent and that said Letters Patent is hereby corrected as shown below:

In the Claims

In column 8, line 48, in Claim 4, delete "data" and insert -- data, --, therefor.

In column 8, line 52, in Claim 4, delete "colors:" and insert -- colors; --, therefor.

In column 9, line 30, in Claim 9, delete "system:" and insert -- system; --, therefor.

Signed and Sealed this  
Fourteenth Day of July, 2015

Michelle K. Lee  
*Director of the United States Patent and Trademark Office*